United States Patent [19]

Jeffers et al.

[11] 3,781,903

[45] Dec. 25, 1973

[54] MAGNETIC IMAGING METHODS AND MEDIA

[75] Inventors: Frederick J. Jeffers; John H. Rolker, both of Altadena, Calif.

[73] Assignee: Bell & Howell Company, Chicago, Ill.

[22] Filed: Nov. 8, 1971

[21] Appl. No.: 196,317

[52] U.S. Cl. .......... 346/74 MP, 117/17.5, 117/235, 118/623, 118/637

[51] Int. Cl. .......... G03g 19/00

[58] Field of Search .......... 346/74 MP, 74 TP; 117/235, 238, 239, 240, 17.5; 118/621, 623, 624, 637

[56] References Cited

UNITED STATES PATENTS 3,465,105 9/1969 Kumada et al. .......... 346/74 MP 3,641,585 2/1972 Hodges .......... 346/74 MP

OTHER PUBLICATIONS

IBM Technical Disclosure Bulletin "Method of Printing Utilizing Magnetic Inks" by Mason, Vol. 4, No. 1, 6/61, p–13.

*Primary Examiner*—Stanley M. Urynowicz, Jr.
*Attorney*—Luc P. Benoit

[57] ABSTRACT

A magnetic imaging method provides a magnetic record of an input image by causing selected portions of a sheet of magnetic recording material to be magnetized substantially to a predetermined depth with alternating magnetic fields having a predetermined wavelength that is correlated to the depth of magnetization and to the diameter of magnetic toner particles employed in the printout of the magnetic record.

46 Claims, 9 Drawing Figures

FIG. 1
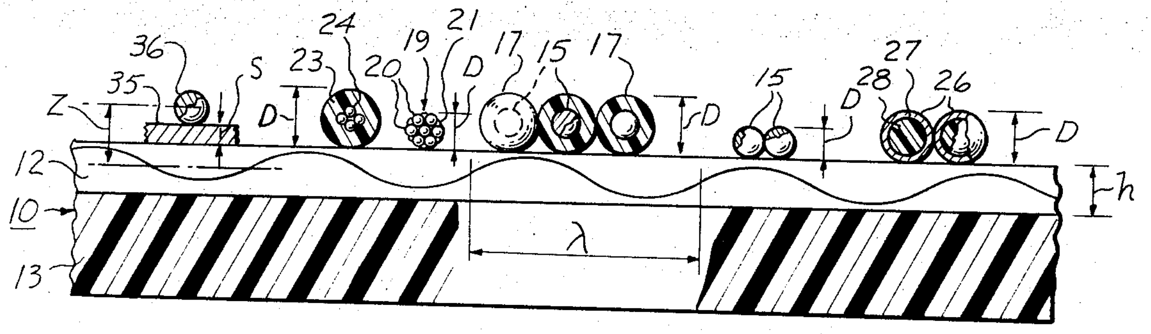
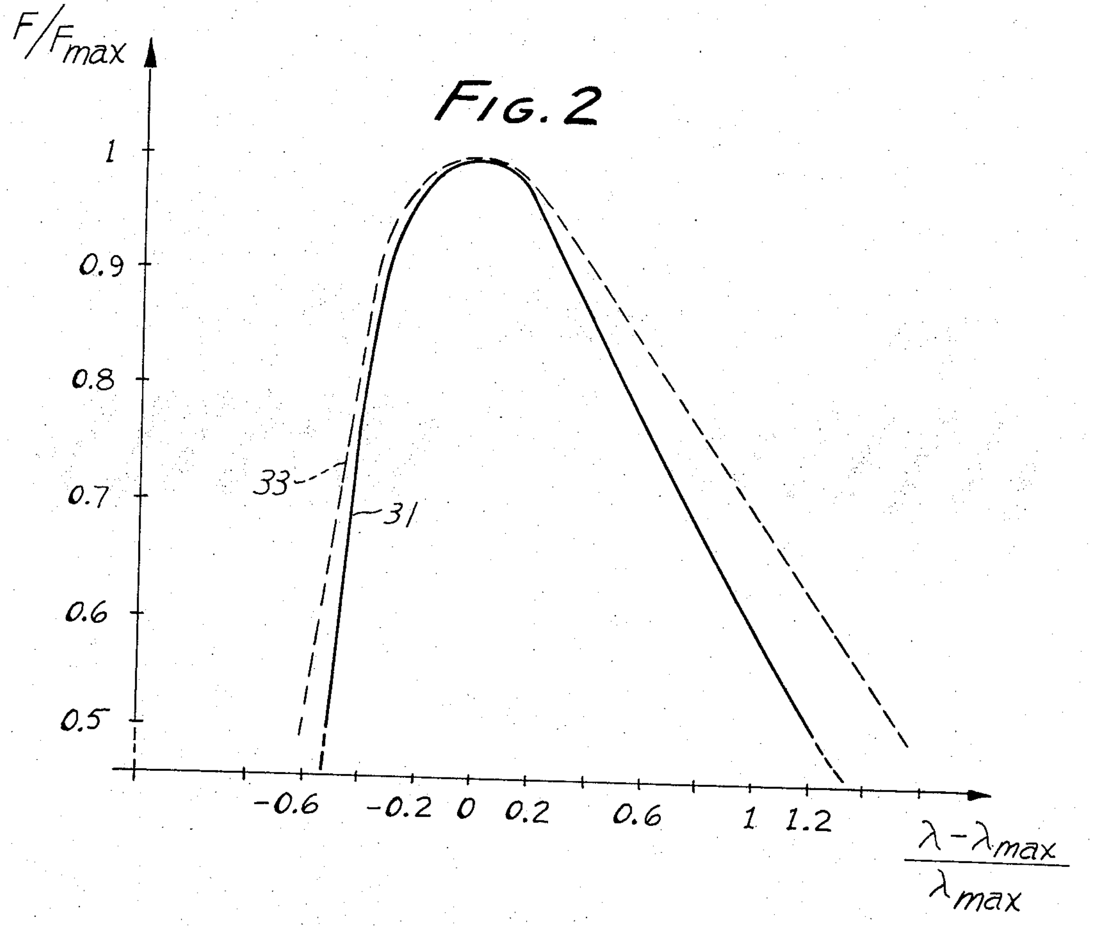
INVENTORS:
FREDERICK J. JEFFERS,
JOHN H. ROLKER
BY
ATTORNEY.

INVENTORS:
FREDERICK J. JEFFERS,
JOHN H. ROLKER
BY
ATTORNEY.

INVENTORS:
FREDERICK J. JEFFERS,
JOHN H. ROLKER
BY
ATTORNEY.

MAGNETIC IMAGING METHODS AND MEDIA

BACKGROUND OF THE INVENTION

1. Field of the Invention

The subject invention relates to magnetic imaging and, more particularly, to methods of providing an image of input information with the assistance of magnetically attractable toner.

2. Description of the Prior Art

Magnetic imaging has been the subject of serious investigation in recent years, since it has several advantages over more conventional imaging techniques.

For instance, magnetic imaging offers the prospect of an avoidance of time-consuming delicate chemical processing steps now required in customary photography, Magnetic imaging also offers the prospect of an avoidance of expensive and potentially dangerous high voltage equipment now required in electrostatic xerography and related techniques.

There still exists a need, however, for improvements in the magnetic imaging process. In particular, magnetic toner images and toner image printouts are often unpredictably poor in contrast and in other quality aspects.

SUMMARY OF THE INVENTION

The subject invention overcomes the above mentioned disadvantages and results in toner images of input information that are characterized by high contrast and large-area fill-in, as well as by gray-scale rendition. The subject invention also provides methods and articles of manufacture for providing toner images having those high qualities.

The subject invention, basically, resides in the discovery that there is, as far as the quality of the resulting toner image is concerned, a correlation between the particle diameter of the magnetic toner with which the images are made, the depth of magnetization to which the input information is magnetically recorded, and the wavelength of alternating magnetic fields with which the magnetic information recording medium is magnetized preparatory to or during the information recording process.

The subject invention in particular resides in the discovery that the latter correlation can be proportioned for optimized toner attraction, and that this correlation can be defined by maximum toner attraction, and that ranges of this correlation can be defined for ranges of toner attraction forces required for particular purposes.

From one aspect thereof, the subject invention is concerned with a method of providing an image of input information, and resides in the improvement comprising, in combination, the steps of providing a magnetizable recording medium, providing a magnetic toner having magnetically attractable particles of substantially a predetermined diameter, magnetizing said recording medium in accordance with said information substantially to a predetermined depth with alternating magnetic fields having as recorded a predetermined wavelength, said toner particle diameter, said depth of magnetization and said wavelength being correlated with each other for optimized toner attraction, and applying said magnetic toner to said magnetized recording medium to provide a toner image of said information.

The word "image" as herein employed is intended to be sufficiently broad to cover not only pictures of persons, animals or things, but also other discernible representations of information in the form of toner accumulations.

The expression "magnetic toner" as herein employed is intended to refer to powders, liquid suspensions, colloids or foams comprising magnetically attractable particles for developing magnetic images or magnetically recorded information.

From another aspect thereof, the subject invention resides in an article of manufacture for providing an image of input information with the aid of a magnetic toner having magnetically attractable particles of substantially a predetermined diameter, characterized by a magnetic recording medium magnetized substantially to a predetermined depth with alternating magnetic fields having as recorded a predetermined wavelength correlated to said depth of magnetization and to said toner particle diameter.

In accordance with a preferred embodiment of the subject invention, the magnetic recording medium is substantially uniformly magnetized as the defined wavelength and to the defined depth whereby the acticle of manufacture is capable of providing an image upon demagnetization of portions distributed in accordance with the information, and upon application of the magnetic toner having the defined particle diameter.

In accordance with another preferred embodiment of the subject invention, the magnetization at the defined wavelength and to the defined depth exists in portions of the recording medium distributed in accordance with the information.

From yet another aspect thereof, the subject invention resides in an image of input information. While the improved contrast, large-area fill-in, and gray-scale rendition of the toner images of the subject invention are novel and constitute major improvements ove the prior art, we are unable to inventively defined these toner images in terms of their structure or composition or other physical property. Accordingly, the toner images of the subject invention are herein defined by the processes for making same.

Accordingly, the subject invention resides in an image of input information, which image is produced by a process comprising, in combination, the steps of providing a magnetizable recording medium, providing a magnetic toner having magnetically attractable particles of substantially a predetermined diameter, magnetizing said recording medium in accordance with said information substantially to a predetermined depth with alternating magnetic fields having as recorded a predetermined wavelength, said toner particle diameter, said depth of magnetization and said wavelength being correlated with each other for optimized toner attraction, applying said magnetic toner to said magnetized recording medium to provide a toner image of said information, and printing out said toner image to provide said image of the input information.

The images of the subject invention may either be located on or at the magnet recording medium, or may be located on a printout carrier upon printout of the toner image.

BRIEF DESCRIPTION OF THE DRAWINGS

The invention will become more readily apparent from the following detailed description of preferred embodiments thereof, illustrated by way of example in the accompanying drawings, in which:

FIG. 1 is a cross-section through a magnetic recording medium and through toner particles, and serves to illustrate features of the subject invention;

FIG. 2 is a magnetic force-versus-wavelength plot illustrating features of the subject invention;

Like reference numerals in the drawings designate like or functionally equivalent parts.

DESCRIPTION OF PREFERRED EMBODIMENTS

Figure 3:
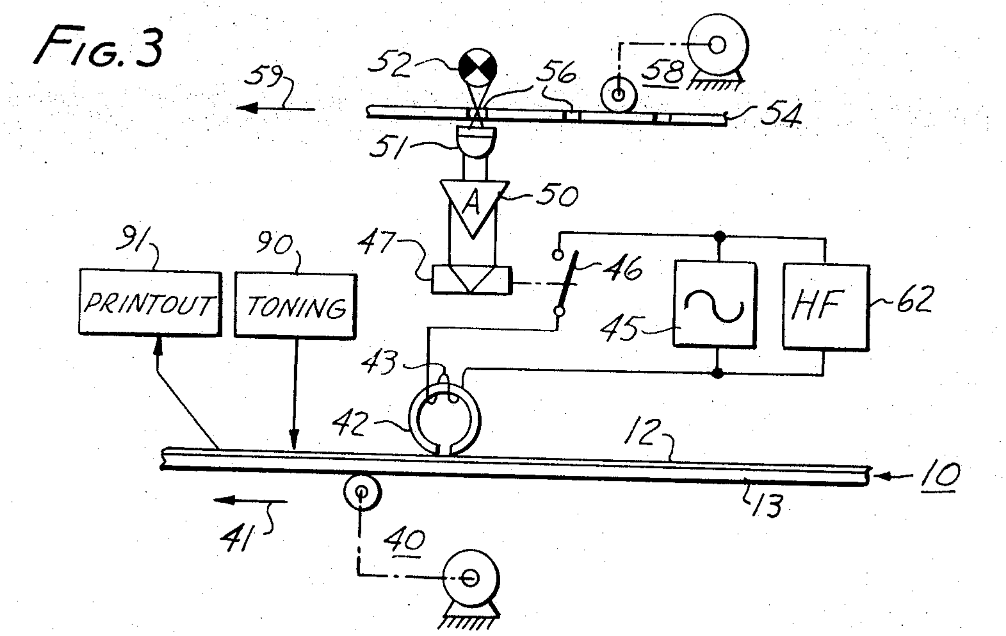
FIG. 3 is a diagrammatic representation of apparatus for magnetically recording information employing a method in accordance with a first preferred embodiment of the subject invention.

The recording medium 10 of FIG. 1 has a sheet 12 of magnetic recording material deposited on a substrate 13. A large number of magnetic recording materials are suitable for the sheet 12. By way of example and not by way of limitation, the sheet 12 may comprise a gamma ferric oxide medium or another iron oxide material of the type conventionally employed in magnetic recording tapes. Alternatively, the sheet 12 may comprise a ferromagnetic chromium dioxide recording medium of the type disclosed and referred, for instance, in British Pat. No. 1,139,232, by E.I. DuPont de Nemours and Company, published Jan. 8, 1969; U.S. Pat. No. 3,512,170, by A.M. Nelson, issued May 12, 1970, and U.S. Pat. No. 3,555,556, by G.R. Nacci, issued Jan. 12, 1971, and herewith incorporated by reference herein.

Chromium dioxide media presently are generally preferred if images are to be recorded with thermomagnetic methods of the type described below. Other suitable low-Curie point materials include the copper zinc ferrite, manganese zinc ferrite, and nickel zinc ferrite materials of the type disclosed and referenced in U.S. Pat. No. 3,250,636, by R.A. Wilferth, issued May 10, 1966, and herewith incorporated by reference herein.

FIG. 1 also shows cross-sections of magnetic toner materials that may be employed in the practice of the subject invention. As is well known in the art of magnetic imaging or printout, magnetic toners typically include particles of iron, nickel, cobalt or a ferromagnetic alloy thereof. As is also well known, each of these materials has a critical particle size below which the particle is of a single-domain nature, and above which the particle is of a multidomain structure at room temperature.

By way of example and not by way of limitation, a toner may be comprised of particles 15 of iron. If small particle size is desired, the particles 15 may, for example, be precipitated from iron pentacarbonyl as described in U.S. Pat. No. 2,938,781, "Production of Magnetic Iron Particles," by Schmeckenbecher, issued May 31, 1960, or may be prepared as disclosed in U.S. Pat. No. 3,228,881, "Dispersion of Discrete Particles of Ferromagnetic Metals," by J.R. Thomas. These U.S. Pat. Nos. 2,938,781 and 3,228,881 are herewith incorporated by reference herein.

The particles 15 need not be provided with a shell since they have sufficient opacity to provide a visible record and since they may be printed out on paper or other printout material having an adhesive coating for retaining the particles 15. In general it is however preferable to provide the particles 15 with shells 17 which keep the particles sufficiently spaced to prevent undue chaining and which facilitates a printout of the toner image. Preferably the shells 17 are of a thermoplastic material which renders the toner fusible and which may, if desired, incorporate a color pigment or dye. Typical examples of shell materials are waxes, such as carnauba or microcrystalline paraffin, polymers, such as copolymers of acrylate or vinyl compounds, or condensation polymers, such as polyketones. Suitable shell materials are also described or referenced in the above mentioned Wilferth patent.

If desired, the toner may be composed of a multitude of toner particles 19 each of which is comprised of a cluster of smaller multidomain or single-domain particles 20 that are held together by a matrix 21. This toner structure is particularly useful if it is desired to operate with toner particles that are single-domain in character but multidomain in overall size. In this case, the subparticles 20 are of single-domain size and are kept together by a matrixing material that may comprise one of the above mentioned waxes or polymers. In the case of the toner particles 19, these waxes or polymers extend between the subparticles 20 but do not form an appreciable shell around the particle cluster.

However, the waxes or polymers or other thermoplastic materials may be employed to provide shells 23 around clusters 24 of multidomain or preferably single-domain particles.

While emphasis has so far been placed on toners in which fusible material forms a shell around ferromagnetic cores, it is also possible to employ a toner 26 in which shells 27 of ferromagnetic material enclose or surround cores of a thermoplastic material. A toner of this type is disclosed in the copending U.S. Pat. application Ser. No. 185,105, "Magnetic Printout Methods and Media", filed Sept. 30, 1971, by John H. Rolker, and assigned to the present assignee.

The toner particles illustrated in FIG. 1 may form part of a dry toner or part of a liquid toner or magnetic ink, as desired.

As this description proceeds it will be noted that considerable importance is attached to the concept of toner particle diameter. The distances that are to be taken as particle diameters are indicated in FIG. 1 for the various toner particles by the letter D. Thus, in the case of a toner that has fusible shells or other particle coatings, the concept of particle diameter does not refer to the diameter of the ferromagnetic core, but rather the diameter of the particle including the shell or coating. If the toner particles are composed of clusters of magnetic subparticles, the concept of particle diameter refers to the diameter of the cluter if the same has no shell or outer coating, or to the diameter of the shell or coating if the particle cluster does have such a shell or coating. In the case of toner particles of the type shown at 27, the concept of particle diameter refers to the diameter of the ferromagnetic shell or skin.

In accordance with the subject invention, superior toner images are obtained if the magnetic images or information records are composed of regions of alternating magnetic polarity which have a wavelength $\lambda$ that is correlated to the particle diameter D of the toner and to the depth of magnetization $h$. For practical purposes the depth of magnetization $h$ typically coincides with the depth or thickness of the magnetic recording sheet. However, this need not necessarily be the case, and it should be understood that the alternating magnetic record may extend to a depth in the sheet that is smaller than the sheet thickness. This may, for instance, be the case if the magnetic fields under consideration are recorded at short wavelengths at which the magnetic recording intensity has a rapid drop-off in a direction into the sheet 12. The designation $z$ will be used hereafter for the distance between the horizontal center plane of the sheet 12 and the toner particle center.

MATHEMATICAL DERIVATIONS

Derivations in terms of Gaussian units will now be presented to illustrate toning optimization by correlation of magnetization wavelength and depth and magnetic toner diameter in accordance with the subject invention.

Two cases will be examined:

1. Magnetic toner particles of multidomain character; and
2. Magnetic toner particles of single-domain character.

To illustrate general cases, these derivations are presented for spherical toner particles and sine wave magnetic recordings. Correlations for other toner shapes and magnetization patterns can be derived from these presentations.

1. Multidomain Toner

The energy (E) of a spherical multidomain particle in a magnetic field can be approximated by $$E = -\tfrac{1}{2}\,\chi\, H^2 V \qquad (1)$$

where $\chi$ = magnetic susceptibility, $V$ = volume of magnetic particle, $H$ = magnetic field intensity.

For spheres composed of high permeability magnetic material (e.g. iron, nickel or other low-anisotropy materials) one can write:

$$\chi \cong 3/4\pi \qquad (2)$$

so that equation (1) becomes $$E = -\tfrac{1}{2}\,(3/4\pi)\, H^2 V \qquad (3)$$

The volume (V) of a spherical particle is $$V = 4\,\pi/3\; r^3 \qquad (4)$$

where $r$ = magnetic particle radius.

Combining the foregoing we obtain $$E = -r^3/2\; H^2 \qquad (5)$$

Spatial variations in this energy impart a force on the particle. If the sheet 12 is magnetized in an alternating pattern of magnetization, the field, H, arising from the layer 12 varies in such a way that the force imparted to the particle is directed principally downwardly perpendicular to the sheet 12. The components of the force vector directed parallel to the layer 12 diminish as the magnetization of the layer approaches a perfect sine wave and are neglected in the present calculation.

The attracting force perpendicular to the sheet 12 may be expressed as $$F = -\sigma E/\sigma z = r^3 H(z)\; \sigma H(z)/\sigma z \qquad (6)$$

Employing the designations $\lambda$, $z$ and $h$ shown in FIG. 1 and defined above, the magnetic field intensity can be expressed as follows, if the layer 12 is uniformly magnetized with a sine wave $$H(z) = 4\pi\, I_r\, \sinh(\pi h/\lambda) e^{-2\pi z/\lambda} \qquad (7)$$

where $4\pi I_r$ = remanent magnetic induction in the sheet 12.

Combining equations (6) and (7) and simplifying, we obtain $$F_z = -2\pi r^3\, H^2\,(z,\lambda)/\lambda \qquad (8)$$

Since a balance of forces determines whether a magnetic particle striking the layer 12 adheres to the layer or not, the wavelength which causes the force, F, to be a maximum will effect an optimization of toning.

The wavelength giving such a maximum force is found as shown below and will be denoted by $\lambda_{md\ max}$. Differentialing equation (8) with respect to $\lambda$ and setting the result equal to zero gives $$\sigma F/\sigma\lambda = -2\,\pi\, r^3\,[H^2(-1/\lambda 2) + 1/\lambda\,(2H\,\sigma H/\sigma\lambda)] = 0$$

or $$2\,\sigma H/\sigma\lambda - H/\lambda = 0 \qquad (9)$$

Using equation (7) in equation (9) and simplifying gives $$2\,\pi\, h/\lambda = 1n\; 2z+h-\lambda/2\pi/2z-h-\lambda/2\pi \qquad (10)$$

Equation (10) is transcendental in nature and cannot be solved for $\lambda$ in closed form in terms of elementary functions. However, a useful approximate solution can be obtained by expanding the logarithmic term in infinite series and simplifying. The result is $$\lambda_{md\ max} \cong 4\pi/3\; Z - \pi h^2/6z \qquad (11)$$

If the particle is in contact with the sheet the variable $z$ can be expressed as $$z = D+h/2 \qquad (12)$$

where D, as shown in FIG. 1, is the diameter of the magnetic particle including any shell it may have. Using equation (12) in equation (11) results in $$\lambda_{md\ max} = 2\pi/3\ \ (D+h) - \pi h^2/3(D+h) \tag{13}$$

Equation (13) is accurate for values for D greater than or equal to about $h/2$. If $D<h/2$ more accurate solutions to equation (10) may be found by conventional graphical techniques. In practice, equation (13) is adequate for most applications.

By way of example a problem of magnetic toning optimization will be solved using equation (13).

Problem I. Spherical multidomain iron particles of a diameter of 5 $\mu$ have a thermoplastic shell of a diameter of 7 $\mu$ and are to be used in toning a magnetic image on a magnetic recording medium having a thickness of 10 $\mu$. How can the formation of the toner image be optimized?

Solution: Employing equation (13) we find that the formation of the toner image can be optimized by recording the magnetic image to a depth equal to the thickness of the recording medium with a sinusoidal magnetic field having an optimum wavelength as recorded of $$\lambda_{max} = 2\pi/3\ (7\ \mu + 10\ \mu) - \pi(10\ \mu)^2/3(7\ \mu + 10\ \mu)$$

or $$\lambda_{max} = 29.4\ \mu$$

This applies if the magnetization penetrates the thickness of the recording medium. If the magnetization of the recording medium has a lesser depth, that depth has to be inserted into equation (13) for the symbol $h$.

In practice it is important to know the behavior of the magnetic toner attraction force as the wavelength of the magnetic recording deviates from the optimum valve of $\lambda_{max}$. The curve 31 in FIG. 2 imparts such knowledge for spherical multidomain particles and is obtained by plotting $F/F_{max}$ as a function of $(\lambda-\lambda_{max})/\lambda_{max}$; where F is the magnetic force acting on the toner, $F_{max}$ is the optimum force when the wavelength is $\lambda_{max}$, $\lambda$ is the actual wavelength, and $\lambda_{max}$ is the optimum wavelength according to the equation (13). Among the many valuable data provided by the curve 13 is the indication that $\lambda_{max}$ does indeed maximize the force of toner attraction, thus effecting toning optimization.

2. Single-Domain Toner

The phrase "single-domain particle" as herein used denotes a single particle or agglomeration of several particles possessing a remanent magnetic dipole moment that is relatively independent of external magnetic fields.

The magnetic field energy of a particle having a permanent magnetic dipole moment m is given by $$E = mH \cos \theta \tag{14}$$

where $H$ = magnetic field, $m$ = magnetic dipole moment, $\theta$ = angle between the $m$ and $H$ vector directions.

If E is large compared to the thermal energy KT ($K = 1.38.10^{-16}$ erg/°K, and $T$ = temperature in degrees Kelvin, °K) then $\theta \cong 0$ and equation (14) becomes $$E \cong -mH \tag{15}$$

E is greater than KT for individual single-domain particles of high magnetic anisotropy materials, such as MnBi and $CoY_5$, and for very low magnetic fields. If low anisotropy materials such as iron, nickel permalloy and the like are used, the approximation still holds if several hundred single domain particles are bound together to form a single toner particle as shown at 19 or 24 in FIG. 1.

Using equation (15) the force, F (vector force), on a particle will be $$\overline{F} = -\text{Grad}\ (E) = \text{Grad}\ (mH)$$
$$\overline{F} \cong m\ \text{Grad}\ (H). \tag{16}$$

This last step is a good approximation since the magnitude of the magnetic moment of a single domain (or high coercivity) particle is virtually independent of external fields. Expanding equation (16) using equation (7) for H gives $$\overline{F} \rightarrow F_z = m\ \sigma H/\sigma z = -2\pi m/\lambda\ H \tag{17}$$

where $\overline{F} \rightarrow F_z$ indicates that the z component of F is the only non-zero component of the vector force $\overline{F}$.

Finding the wavelength $\lambda$ that maximizes the force $F_z$ proceeds in fashion similar to that used in finding $\lambda_{max}$ for case 1 on multidomain toner. The result is $$\lambda_{sd\ max} \cong \pi z - \pi h^2/6z \tag{18}$$

If the particle is in contact with the sheet 12 equation (12) holds and equation (18) is $$\lambda_{sd\ max} \cong \pi/2\ (D+h) - \pi h^2/3(D+h) \tag{19}$$

In equation (19), $\pi_{sd\ max}$ is the wavelength affording optimized toning for single domain toner particles, D is the particle or particle cluster diameter including any non-magnetic shell that it may have and $h$ is the depth of magnetization of the sheet 12 as defined above.

Comparing equation (19) with equation (13) we find that the optimum wavelength for the single domain case is about 25 percent smaller than that for the multidomain case for values of D comparable or larger than $h$. Equation (13) is a close approximation to the exact solution if D is comparable to or greater than $h$ and gives answers that are adequate for most practical purposes. If $D<h$, more accurate solutions may be found by conventional graphical techniques.

By way of example, a problem similar to the above Problem I will now be solved for single-domain toner particles.

Problem II. Single-domain iron particles are incorporated in a spherical thermoplastic shell of a diameter of 12 $\mu$ and are to be used in toning a magnetic image on a magnetic recording medium having a thickness of 10 $\mu$. How can the toner image be optimized?

Solution: Employing equation (19) we find that the formation of the toner image can be optimized by recording the magnetic image to a depth equal to the thickness of the magnetic recording medium with a sinusoidal magnetic field having an optimum wavelength as recorded $$\lambda_{sd\ max} \cong \pi/2\ (12\ \mu + 10\ \mu) - \pi(10\ \mu)^2/3(12\ \mu + 10\ \mu)$$

or $$\lambda_{sd\ max} = 29.8\ \mu$$

If the depth of magnetization is smaller than the thickness of the recording medium, that smaller depth has to be inserted into equation (19) for the symbol $h$.

Again, it is important to known the behavior of the magnetic toner attraction force as the wavelength of the magnetic recording deviates from the optimum value. The dotted curve 33 in the plot of FIG. 2 imparts such knowledge for single-domain particle toner. It will be noted that the curve 33 is somewhat winder than, but nevertheless similar to, the curve 31.

Considering curves 31 and 33 we find that the toner attraction force drops by as much as 20 percent when the wavelength of the magnetic recording deviates by some 0.7 to 1.5 times from the optimum value. The toner attraction force is as much as halved if the wavelength of the magnetic recording deviates by some one-half to five-halves from the optimum value.

Experiments have confirmed that the contrast of a toner image produced with a magnetic image providing only one half the optimum force is very substantially weaker as compared to the contrast of a toner image produced with a magnetic image providing the optimum magnetic force $F_{max}$.

How much reduction in contrast is tolerable in practice depends on the application of the magnetic imaging process. At one extreme, sharp contrast is very important in the case of micro-imaging or holography while, at the other extreme, contrast variations resulting from deviations of some 30 percent $F_{max}$ are typically tolerable in the office copier field.

Taking the latter 30 percent deviation as an empirical guide we find from FIG. 2 that the corresponding wavelength variation is approximately from 0.5 to 2 $\lambda_{max}$.

To obtain workable upper and lower limits that are generally applicable within tolerable variations to single-domain and multidomain toners, we employ the equation (13) for the upper limit, $\lambda_u$, of $2\lambda_{max}$ and obtain $$\lambda_u = 4\pi/3\ (D+h) - 2\pi h^2/3(D+h) \tag{20}$$

and we employ the equation (19) for the lower limit, $\lambda_l$, of 0.5 $\lambda_{max}$ to obtain $$\lambda_l = \pi/4\ (D+h) - \pi h^2/6(D+h) \tag{21}$$

This leads to a range of preferred wavelength of $$\text{from } \pi/4\ (D+h) - \pi h^2/6(D+h) \text{ to } 4\pi/3\ (D+h) - 2\pi h^2/3(D+h) \tag{22}$$

On the basis of FIG. 2 and the explanations given above with respect to the curves 31 and 33, it is readily possible to provide wavelength ranges for other $F/F_{max}$ ratios of interest.

So far it has been tacitly assumed that the toner particles are applied directly to an exposed surface of the medium which contains the magnetic image. In practice this is typically the case since the external magnetic field of the recorded image is strongest at the recording medium. However, situtations arise in which the toner particles are applied to a surface which is spaced from the surface of the image-bearing recording medium.

For instance, soiling and excessive wear of the recording medium by the toning and toner image transfer processes can be avoided if the toner images are formed on the outside of a printout sheet that is held against the image-bearing recording medium. By way of further example, it may be desired to provide the recording medium with a tough coating that reduces wear of the recording medium during printout. These cases are illustrated in FIG. 1 by showing a layer 35 of a thickness s deposited on the outer surface of the magnetic recording sheet 12. The layer 35 may be printout medium (paper, film, foil), or a protective coating for the sheet 12. The protective coating may, for instance, be of the same material as the substrate 13.

The toner particles are symbolically shown at 36 and may be any of the unshelled, shelled or other particles depicted at 15 through 28. If the particles are of a multidomain nature, the above equation (11) is employed to determine the optimal wavelength, with $h$ in that equation being as before the depth of magnetization of the sheet 12 and $z$ being now $$z = s + D + h/2 \tag{23}$$

If the particles are of a single-domain nature, the above equation (18) is employed with $z$ being as defined in equation (23).

The range of equation (22) may then be restated in terms of $z$ and $h$ as $\lambda$ being within a range of $$\text{from } \pi/2\ (z - h^2/6z) \text{ to } \pi/3\ (8z - h^2/z) \tag{24}$$

wherein $\lambda$ is the wavelength of magnetization, $h$ is the depth of magnetization, and $z$ is equal to $s + (D+h)/2$, with D being the particle diameter and $s$ the spacing between the magnetic recording medium and the applied toner particles.

The value $z$ as just defined may also be employed in the equations (11) and (18), for instance.

The equations (11), (18), and (24) present general cases since $s$ may have a value greater than zero as shown in FIG. 1 at 35, or may be zero when the toner particles are in direct contact with the magnetic recording sheet 12 as also shown in FIG. 1 for the toner particles 15 through 28.

Ranges similar to the range of equations (22) and (24) may be developed specifically for multidomain toner particles. For instance, the equations (11) and (13) provide the following preferred ranges for the recorded wavelength in the case of magnetic toner comprising multidomain particles:

$$\text{from } 2\pi/3\ (z - h^2/8z) \text{ to } \pi/3\ (8z - h^2/z) \tag{25}$$

and $$\text{from } \pi/3\ (D+h) - \pi h^2/6(D+h) \text{ to } 4\pi/3\ (D+h) - 2\ \pi\ h^2/3(D+h) \tag{26}$$

By way of further example, the equations (18) and (19) provide the following preferred ranges for the recorded wavelength in the case of magnetic toner comprising single-domain particles:

$$\text{from } \pi/2\,(z - h^2/6z) \text{ to } 2\pi z - \pi h^2/3z \tag{27}$$

and $$\text{from} \pi/4\,(D+h) - \pi\, h^2/6(D+h) \text{ to } \pi\,(D+h) - 2\,\pi\, h^2/3(D+h) \tag{28}$$

Apparatus and methods for providing alternating magnetic records will now be disclosed.

According to FIG. 3 the recording medium 10 is moved by a drive 40 in the direction of an arrow 41 and past a magnetic recording head 42 which is in contact with the sheet of magnetic material 12. The magnetic recording head 42 has a winding 43 energized from a source of alternating current 45 through a contact 46 of a relay 47.

The relay is energized by an amplifier 50 which has an input driven by a photocell 51 which together with a lamp 52 forms a reader for a punched data card 54. As its name implies, the card 54 carries information that is represented by punched apertures 56.

A card 58 which preferably operates in synchronism with the drive 40 advances the card 54 between photocell 51 and lamp 52 in the direction of an arrow 59. As long as the photocell 51 is obscured from the lamp 52 by the body of the card 54, the relay 47 is deenergized and the contact 46 is open so that the recording head winding 43 is disconnected from the source 45 and no magnetic signal is recorded.

Whenever an aperture 56 moves into registration with the photocell 51 and lamp 52, the photocell is exposed for the generation of a photocurrent which during its subsistence drives the amplifier 50 for an energization of the relay 17 and closure of the relay contact 46. The winding 43 is then connected to the source 45 for the recording of an alternating-polarity magnetization on the magnetic recording sheet 12 by the head 42. The body of the card 54 again obscures the photocell as the advancement of the card continues and the recording of the alternating current from the source 45 accordingly ceases until the next aperture 56 is encountered.

In accordance with features of the subject invention, the source 45 is constructed to provide a frequency of $$f = v/\lambda \tag{29}$$

wherein $f$ is the frequency of the current provided by the source 45 and energizing the winding 43, $v$ is the speed of the recording medium 12 past the recording head 42 and in the direction of the arrow 41, and $\lambda$ is the wavelength at which the alternating-polarity magnetization is desired to be recorded in the sheet 12.

If it is desired to provide a visible record of the card apertures 56 with the aid of a multidomain toner, the wavelength $\lambda$ is selected pursuant to either of the above equations (11) and (13). If the visible record is to be established with a single-domain toner, either of the equations (18) and (19) are employed in determining $\lambda$ in equation (29). As before, the equation (22) may be employed for multidomain or single-domain toner if utmost contrast is not essential.

To improve the quality of the sine-wave alternating-polarity magnetic recording in the sheet 12, the current from the source 45 is preferably recorded with a high-frequency bias of the type conventionally employed in magnetic tape recording. To this end, a source 62 of high-frequency bias current is shown connected in FIG. 3 across the recording head winding 43 in parallel to the alternating current source 45.

Alternating-polarity magnetic recording provided in the sheet 12 in accordance with FIG. 3 may be rendered visible by applying thereto magnetically attractable toner; such as one of the toner types shown in FIG. 1. The resulting toner image may be printed out on a printout medium, such as a web of paper, film or foil. Magnetic toning and printout methods and apparatus are disclosed in U.S. Pat. No. 2,932,278, by J.C. Sims, issued April 12, 1960, U.S. Pat. No. 2,943,908, by J.P. Hanna, issued July 5, 1960, and U.S. Pat. No. 3,250,636, by R.A. Wilferth, issued May 10, 1966, the disclosures of which are herewith incorporated by reference herein.

The toner record thus provided of the information on the punched card 54 may be read out optically or magnetically, inasmuch as the magnetic toner image is both optically and magnetically discernible.

Figures 4, 5, 6:
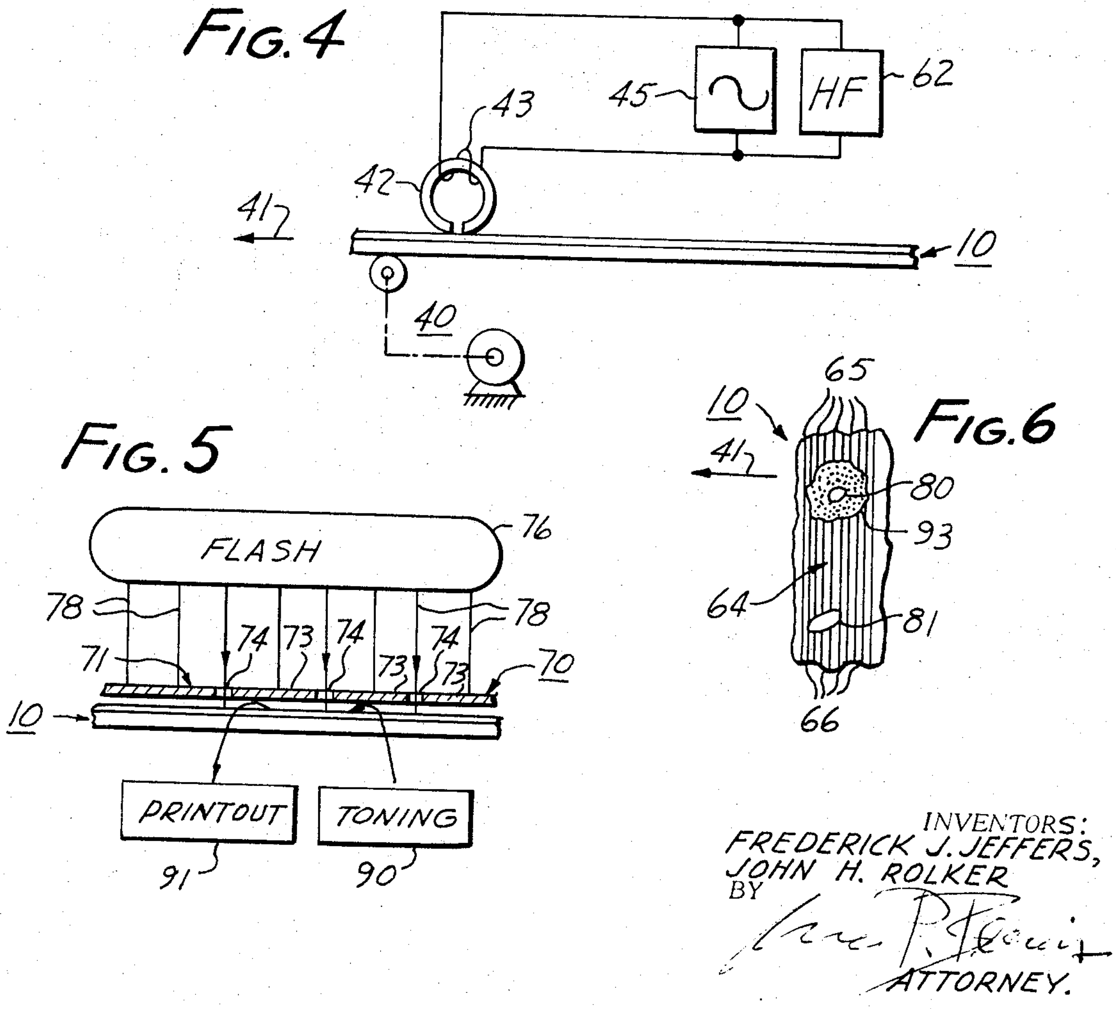
FIG. 4 is a diagrammatic representation of a premagnetization method in accordance with a further preferred embodiment of the subject invention.
FIG. 5 is a diagrammatic representation of an imaging method that may be employed in conjunction with the premagnetization according to FIG. 4.
FIG. 6 is a fractional diagrammatic showing, on an enlarged scale, of a magnetic line pattern recorded by the method of FIG. 4.

According to FIGS. 4 to 6, a pattern of magnetic lines of alternating polarity is recording on the recording medium 10 and is thereafter subjected to information-controlled erasure by a thermomagnetic effect. The wave-length of the recorded magnetic line pattern is selected in accordance with the subject invention.

By way of example and as shown in FIG. 4, the above mentioned equipment comprising the drive 40, the recording head 42 with winding 43, the source of alternating current 45 and the source of high-frequency bias current is employed to record a pattern of magnetic lines of alternating polarity on the magnetic recording medium 10. A diagrammatic showing of the recorded magnetic line pattern appears at 64 in FIG. 6.

According to FIG. 6, the line pattern 64 is composed of a multitude of alternating lines 65 and 66. The lines 65 have a first magnetic polarity as seen in the direction of the arrow 41, the lines 66 have a second magnetic polarity as seen in that direction.

The magnetic recording head 42 may be as wide as the magnetic recording medium in which case the lines 65 and 66 will each extend transversely across the medium 10. The magnetic line pattern recorded in the method of FIG. 3 is similar to the line pattern recorded in the method of FIG. 4, except that the recording head 42 used in FIG. 3 typically is narrower than the width of the medium 10, so that information corresponding to the apertures 56 will only be magnetically recorded in relatively narrow recording channels.

The wavelength of the magnetic line pattern 64 is selected in accordance with the above mentioned principles of the subject invention to provide for maximum toner attraction. As indicated by the equation (29) the desired wavelength may be provided by appropriately selecting the recording speed and the frequency of the recording current.

The recorded magnetic line pattern 64 is subjected in the method of FIG. 5 to information-controlled or imagewise erasure. For this purpose, the magnetic recording medium used in the method of FIGS. 4 to 6 is preferably a low-Curie point recording medium. These are well known in the art of magnetic imaging and include, for example, low-Curie point manganese arsenide or chromium dioxide media that have a sufficiently high coercivity to retain an imposed magnetization until an erasure thereof is effected.

According to FIG. 5, a master 70 of an image 71 to be magnetically recorded is superposed on the medium 10 which has the magnetic line pattern recorded thereon. The master 70 has opaque portions 73 and light portions 74 representing the information of image to be recorded. The master 70 may, for instance, be a photographic transparency, a print on a transparent base, or a stamping in a metal foil in which the transparent portions 74 have been cut out.

Further according to FIG. 5, a source 76 of light or heat radiations 78 is employed to expose the magnetic recording medium 10 to the master image 71. Suitable light sources and magnetic recording media, as well as suitable imagewise demagnetization techniques are disclosed in U.S. Pat. No. 3,555,556, Thermomagnetic Recording, by G.R. Nacci, issued Jan. 12, 1971, and herewith incorporated by reference herein.

The flash of light or heat radiation 78 momentarily heats the magnetized recording medium 10 above its Curie point where it penetrates the transparent portions 74 of the master 70. In consequence, portions of the medium 10 which correspond to the transparent portions of the record 70 are demagnetized. Two examples of demagnetized portions on the medium 10 are shown in FIG. 6 at 80 and 81.

Upon the flash exposure of FIG. 5, the image 71 on the master 70 is magnetically recorded on the low-Curie point medium 10 in that portions of that medium which correspond to light portions of the image 71 are demagnetized, while portions of the medium 10 which correspond to dark portions of the image 71 remain magnetized by the alternating-polarity magnetic line pattern 64. This line pattern attracts magnetic toner which defines the image and provides larg-area fill-in and gray-scale rendition. A fraction of the resulting toner image is shown at 93 in FIG. 6. In actuality, all the magnetic lines 65 and 66 are covered by the applied toner while the demagnetized portions (80, 81, etc.) are not covered. The toner size, the wavelength and the effective thickness of the recording medium or depth of recording are correlated in accordance with the teachings of the subject invention for maximum or optimized toner attraction.

Magnetic toning may be effected by one of the above mentioned toning methods. Printout of the toner image may be effected by one of the methods disclosed in the above mentioned patents, or in any other conventional manner. Toning and printout have been symbolically shown in FIGS. 3 and 5 by the boxes 90 and 91.

When considering FIGS. 3 and 4 it will be recognized that the alternating current supplied by the source 45 will not necessarily be recorded in the form of an ideal sine wave. In particular, the coercivity of the magnetic recording medium may prevent recording of the low-amplitude portions adjacent the zero crossovers of the sine wave current. The described principles of the subject invention are not in their board connotation dependent on a sine wave shape of magnetization, but are applicable to other periodic recordings. The wavelength is then defined as the smallest distance between corresponding points in adjacent periods.

The subject invention resides not only in the disclosed imaging methods and in the resulting images, but also in articles of manufacture for providing an image of input information with the aid of a magnetic toner, as herein defined.

In accordance with the preferred embodiment shown in FIGS. 5 and 6, the article of manufacture of the subject invention may comprise the recording medium 10 with the magnetic line pattern 64 composed of magnetic lines 65 and 66 of alternating magnetic polarity. The magnetic line pattern 64 has a wavelength in accordance with the subject invention pertaining to the correlation of the recorded wavelength to the above mentioned parameters.

The article of manufacture having the magnetic line pattern 64 with a preferred wavelength may, for instance, be sold to users who will demagnetize portions of the recording medium 10 corresponding to the input information and who will tone the resulting magnetic record with toner having the corresponding particle size to produce the desired image or images.

In accordance with another preferred embodiment of the subject invention shown in FIG. 6, the article of manufacture of the subject invention may comprise the recording medium 10 with the magnetic line pattern 64 having demagnetized portions 80 and 81 in accordance with the input information 71, or with the magnetic line pattern having been recorded as disclosed in FIG. 3. The line pattern 64 is composed of magnetic lines 65 and 66 of alternating magnetic polarity having a wavelength in accordance with the subject invention as disclosed above.

This article of manufacture with information-wise demagnetized portions may be stored, or may be sold to users, for subsequent development or development and printout of the magnetic image with toner having a particle size corresponding to the recorded wavelength of the line pattern as herein disclosed.

It will thus be recognized that the article of manufacture with the uniform magnetic line pattern, as well as the article of manufacture with the information-representative line pattern has utility of its own.

While the provision of a preferred recorded wavelength for a given toner particle diameter and depth of magnetization has been emphasized herein, it should be understood that the subject invention is not limited thereto, but may, for instance, also be practiced by selecting a preferred toner particle diameter for a given recorded wavelength and depth of magnetization, or by selecting a preferred depth of magnetization for a given recorded wavelength and toner particle diameter.

Figure 7:
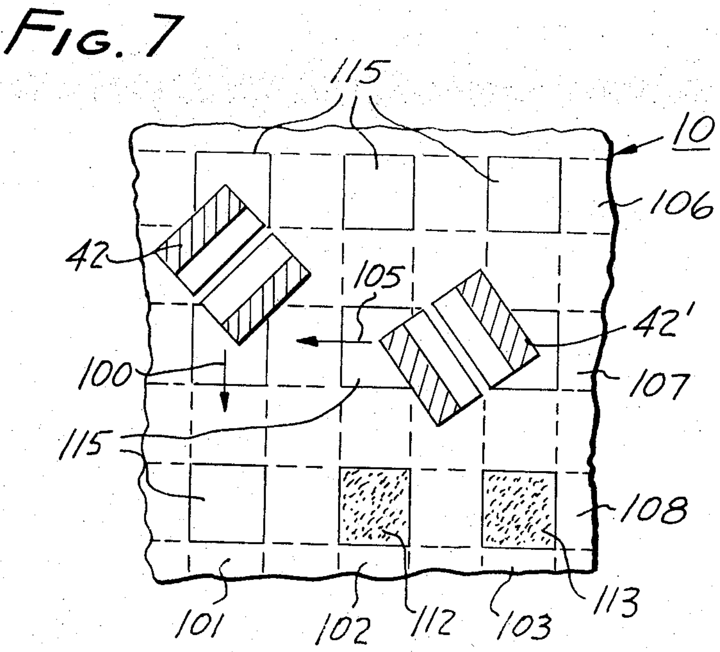
FIG. 7 is a fractional diagrammatic showing, on an enlarged scale, of a magnetic dot pattern recorded in accordance with a further preferred embodiment.

The principles of the subject invention can also be employed in the recording of crossed magnetic lines and/or in the provision of dotted toner images. In accordance with the preferred embodiment shown in FIG. 7, the magnetic recording head 42, shown in side view in FIG. 4 and shown in section in FIG. 7, is moved relative to the magnetizable medium 10 in the general direction of the arrow 100 in spaced parallel paths to record a pattern of parallel magnetic lines 101, 102, 103 et seq. The magnetic head 42 is then moved by an angle, such as 90°, about an axis vertical to the top surface of the magnetizable medium 10. The resulting position of the head 42 is shown in FIG. 7 at 42'. In the position 42' the airgap of the recording head extends at an angle of 90° to the airgap in the head position shown at 42 in the preferred embodiment of FIG. 7.

The recording head in the position 42' is then moved relative to the recording medium 10 in the general direction of the arrow 105 in spaced parallel paths to record a pattern of parallel magnetic lines 106, 107, 108, et seq.

The recording head 42, while recording the lines 101, 102, 103, et seq., and while recording the lines 106, 107, 108, et seq., is energized, in the manner shown in FIG. 4, by alternating currents resulting in a recording at wavelength determined in accordance with the subject invention in correlation to the depth of magnetization and with the size of the toner particles to be applied, as herein taught.

This insures toner attraction at maximum force. The use of the crossed magnetic line pattern disclosed in connection with FIG. 7 is particularly recommended where the technique of FIG. 6 would lead to objectionable moire patterns in the toner image. dots An interesting effect has been observed in the practice of the method of FIG. 7. Toner images formed on the crossed magnetic line patterns of FIG. 7 tend to be characterized by discrete small piles or spaced dots of toner as diagrammatically shown at 112 and 113. Instead of a toner area permeated by spaced untoned dots, we have obtained toned areas composed of toner piles or dots 112, 113, et seq. This is very advantageous in terms of gray scale rendition and is conducive to large-area fill-in. Given this toning effect, the magnetization may be considered as substantially consisting of discrete magnetic dots 115. It thus follows that the magnetization to the predetermined depth and at the wavelength according to the invention is in the preferred embodiment of FIG. 7 present at least at crossing points of a prerecorded magnetic line pattern 101, 102, 103, et seq., and 106, 107, 108, et seq. More specifically, in accordance with this preferred embodiment, the magnetization to the predetermined depth and at said wavelength is present in a pattern of mutually spaced dots 115.

In our work we have found that the dot pattern is particularly pronounced when the recording head gap extends at an angle of from 30° to 50° (such as an angle of 45°) to the direction of head advancement 100 and then 105. If the magnetizable recording medium 10 is comprised of oriented magnetizable particles, then the recording head gap extends preferably at an angle of from 30° to 50° (such as an angle of 45°) to the particle orientation.

After premagnetization in the manner shown in FIG. 7, a magnetic image of input information may be formed in the fashion shown in FIG. 5, by selective demagnetization of image-representative areas. This magnetic image may then be toned and printed out in the manner herein disclosed.

Figure 8:
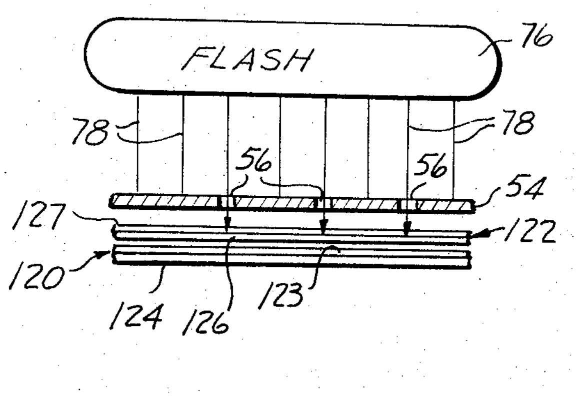
FIGS. 8 and 9 are diagrammatic representations of a magnetic imaging method and article of manufacture in accordance with a further preferred embodiment of the subject invention.
Figure 9:
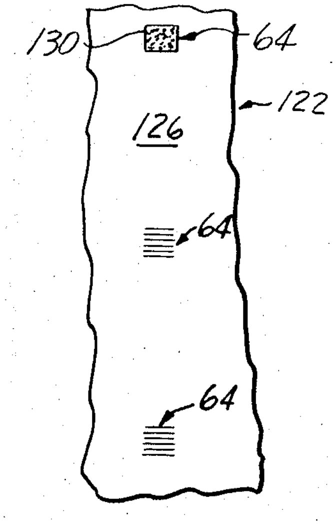

A further embodiment of the subject invention is illustrated in FIGS. 8 and 9 with reference to FIGS. 3, 4, 5 and 6.

The magnetic recording or imaging method of FIG. 8 employs a magnetization medium 120 and a magnetic recording medium 122. The magnetization medium 120 has a layer of magnetizable material 123 on a substrate 124. The magnetic recording medium 122 has a layer of magnetizable material 126 on a substrate 127. At least the substrate 127 is transparent to the light or heat radiations 78 emitted by the previously described source 76.

The magnetizable material of the layer 123 of the magnetization medium 120 typically has a Curie point higher than the temperature to which it will be heated by the radiations 78 of the source 76. For instance, the magnetizable material of the layer 123 may comprise gamma ferric oxide or another iron oxide material of the type conventionally employed in magnetic recording tapes.

The layer 123 of the magnetization medium 120 has recorded thereon a pattern of alternatingly poled magnetic lines of the type shown at 65 and 66 in the magnetic line pattern 64 of FIG. 6. This line pattern on the layer 123 is not information modulated and may have been recorded in the manner shown in FIG. 4.

The magnetizable material of the layer 126 of the recording medium 122 typically has a Curie point substantially equal to, or lower than, the temperature to which it will be heated by the radiations 78 of the source 76. Alternatively, the layer 126 may have such a coercivity characteristic that its magnetizable material will not be magnetized by the magnetic line pattern of the layer 120 at a lower temperature, such as room temperature, but that the magnetic line pattern of the layer 120 will be able to magnetize portions of the layer 126 that have been heated to an elevated temperature. In brief, the magnetizable material of the layer 126 may have a strong temperature-dependent coercivity.

Examples of magnetic recording techniques with magnetic materials having temperature-dependent coercivities are, for instance, disclosed in the above mentioned Nacci U.S. Pat. No. 3,555,556 and also in U.S. Pat. No. 2,793,135, by Sims et al., issued May 21, 1957. The U.S. Pat. No. 3,465,105, by Kumada et al, issued Sept. 2, 1969, discloses further materials with temperature-dependent coercivities. layer Examples of magnetic recording techniques in which a low-Curie point material is thermoremanently magnetized are disclosed in the above mentioned British Pat. No. 1,139,232, in U.S. Pat. No. 3,541,577, by James U. Lemke, issued Nov. 17, 1970, and in the above mentioned Nacci Pat. No. 3,555,556.

The media 120 and 122 are disposed adjacent each other as shown in FIG. 8. An information record or card 54 with information recordings or apertures 56 is located atop the medium 122. The layer 126 is exposed to the radiations 78 from the source 76 through the apertures 56. Where radiations 78 penetrate the apertures 56, the magnetizable material in the layer 126 is heated to the temperature requisite to the magnetization of layer portions by the magnetic line pattern prerecorded on the magnetization medium 120.

The latter requisite temperature typically is a temperature at, in or above the Curie temperature range of the layer 126 if the information is to be recorded in the layer 126 by thermoremanent magnetization. In that case, portions of the magnetic line pattern 64 with alternatingly poled magnetic lines 65 and 66 (see FIG. 6) are copied into the layer 126 (see FIG. 9) when the heated portions of the layer 126 cool back from the Curie point region in the presence of the magnetic line pattern 64 prerecorded on the layer 123 of the magnetization medium 120.

On the other hand, the latter requisite temperature is a temperature below the Curie temperature range of the layer 126 if information is to be recorded in the layer 126 by a technique which relies on a drop in coercivity of the layer 126 at below-Curie point temperatures.

The resulting information recordings are shown at 64 in FIG. 9 and correspond to the apertures 56 of the card 54 in size and spatial distribution. Because of the manner in which the magnetization of the medium 120 has been recorded, the information recordings on the medium 122 has a wavelength which is correlated in accordance with the subject invention to the depth of magnetization and to the size of the toner particles employed for printout of the recorded information. Accordingly, toning of the magnetic record, indicated by way of example at 130 in FIG. 9, is optimized in accordance with the principles of the subject invention.

The depth of magnetization of the copied pattern portions 64 typically is equal to the thickness of the layer 126, assuming that the layer 126 is heated to the requisite temperature throughout its thickness. Where this is not the case, and where it is important that toning be maximized at portions of the layer 126 which are only heated to the requisite temperature to a certain depth less than the thickness of the layer 126, the wavelength is correlated to that certain depth rather than to the thickness of the layer 126.

In either case, the depth of magnetization to which the wavelength is correlated is the depth of magnetization of the layer 126 of the recording medium 122, rather than the depth of magnetization of the layer 123 of the magnetization medium 120. This has to be taken into account in recording the magnetic pattern on the medium 120, if the depth of magnetization of the layer 123 is different from the depth of magnetization of the layer 126 for which toning is to be optimized.

The method of FIGS. 8 and 9 may thus be summarized by saying that the recording medium 122 is magnetized in accordance with the information 56 by providing (in the magnetizing medium 120) a magnetic pattern (see 64, FIG. 6) having the above mentioned wavelength (correlated to the predetermined depth of magnetization of the recording medium 122 and to the toner particle diameter), and by selectively copying that magnetic pattern into the recording medium 122 in accordance with the information 56 to provide a magnetic record of that information (see FIG. 9) having the above mentioned wavelength and extending in the recording medium 122 (layer 126) to the above mentioned predetermined depth.

The article of manufacture resulting from a practice of the method of FIGS. 8 and 9 is similar to the article of manufacture resulting from the practice of the method of FIG. 3. The resulting toner images are, however, distinguished by the different methods by which they have been made. The toner images resulting from the method of FIGS. 8 and 9, like the toner images resulting from the method of FIG. 3, may be visually, optically and/or magnetically read. No magnetic reading is possible with the aperture 56 in the card 54, and apertures are typically more difficult to copy as apertures than as magnetic records and toner images.

While specific embodiments have been disclosed and illustrated herein, modifications or variations within the spirit and scope of the subject invention will become apparent or suggest themselves to those skilled in the art.

We claim:

1. In a method of providing an image of input information, the improvement comprising in combination the steps of:

providing a magnetizable recording medium;

providing a magnetic toner having magnetically attractable particles of substantially a predetermined diameter;

magnetizing said recording medium in accordance with said information substantially to a predetermined depth with alternating magnetic fields having as recorded a predetermined wavelength, said toner particle diameter, said depth of magnetization and said wavelength being correlated with each other for optimized toner attraction; and applying said magnetic toner to said magnetized recording medium to provide a toner image of said information.

2. A method as claimed in claim 1, wherein:

said applied magnetic toner is spaced from said magnetized recording medium; and said wavelength is within a range of $$\text{from } \pi/2\ (z - h^2/6z) \text{ to } \pi/3\ (8z - h^2/2)$$

wherein $h$ is said depth of magnetization, $z$ is equal to $s + (D+h)/2$, $D$ is said toner particle diameter, $s$ is the spacing between the magnetic recording medium and the applied toner particles, and $\pi$ is equal to the ratio of the circumference of a circle to its diameter.

3. A method as claimed in claim 1, wherein: said wavelength is within a range of $$\text{from } \pi/4\ (D+h) - \pi\ h^2/6(D+h) \text{ to } 4\pi/3\ (D+h) - 2\ \pi\ h^2/3(D+h)$$

wherein $h$ is said depth of magnetization, $D$ is said toner particle diameter, and $\pi$ is equal to the ratio of the circumference of a circle to its diameter.

4. A method as claimed in claim 1, wherein:

said magnetic toner comprises multidomain magnetically attractable particles;

said applied magnetic toner is spaced from said magnetized recording medium; and said wavelength is within a range of $$\text{from } 2\ \pi/3\ (z - h^2/8z) \text{ to } \pi/3\ (8z - h^2/z)$$

wherein $h$ is said depth of magnetization, $z$ is equal to $s + (D++h)/2$, $D$ is said toner particle diameter, $s$ is the spacing between the magnetic recording medium and the applied toner particles, and $\pi$ is equal to the ratio of the circumference of a circle to its diameter.

5. A method as claimed in claim 1, wherein:

said magnetic toner comprises multidomain magnetically attractable particles; and said wavelength is within a range of $$\text{from } \pi/3\ (D+h) - \pi\ h^2/6(D+h) \text{ to } 4\pi/3\ (D+h) - 2\ \pi\ h^2/3(D+h)$$

wherein $h$ is said depth of magnetization, $D$ is said toner particle diameter, and $\pi$ is equal to the ratio of the circumference of a circle to its diameter.

6. A method as claimed in claim 1, wherein:

said magnetic toner comprises single domain magnetically attractable particles;

said applied magnetic toner is spaced from said magnetized recording medium; and said wavelength is within a range of $$\text{from } \pi/2\ (z - h^2/6z) \text{ to } 2\pi z - \pi h^2/3z$$

wherein
$h$ is said depth of magnetization,
$z$ is equal to $s + (D+h)/2$,
$D$ is said toner particle diameter,
$s$ is the spacing between the magnetic recording medium and the applied toner particles, and
$\pi$ is equal to the ratio of the circumference of a circle to its diameter.

7. A method as claimed in claim 1, wherein:
said magnetic toner comprises single-domain magnetically attractable particles; and
said wavelength is within a range of $$\text{from } \pi/4\ (D+h) - \pi\ h^2/6(D+h) \text{ to } \pi\ (D+h) - 2\ \pi\ h^2/3(D+h)$$

wherein
$h$ is said depth of magnetization,
$D$ is said toner particle diameter, and
$\pi$ is equal to the ratio of the circumference of a circle to its diameter.

8. A method as claimed in claim 1, wherein:
said magnetic toner comprises multidomain magnetically attractable particles;
said applied magnetic toner is spaced from said magnetized recording medium; and
said wavelength is substantially equal to $$4\ \pi z/3 - \pi h^2/6z$$

wherein
$h$ is said depth of magnetization,
$z$ is equal to $s + (D+h)/2$,
$D$ is said toner particle diameter,
$s$ is the spacing between the magnetic recording medium and the applied toner particles, and
$\pi$ is equal to the ratio of the circumference of a circle to its diameter.

9. A method as claimed in claim 1, wherein:
said magnetic toner comprises multidomain magnetically attractable particles; and
said wavelength is substantially equal to $$2\ \pi/3\ (D+h) - \pi\ h^2/3(D+h)$$

wherein
$h$ is said depth of magnetization,
$D$ is said toner particle diameter, and
$\pi$ is equal to the ratio of the circumference of a circle to its diameter.

10. A method as claimed in claim 1, wherein:
said magnetic toner comprises single domain magnetically attractable particles;
said applied magnetic toner is spaced from said magnetized recording medium; and
said wavelength is substantially equal to $$\pi z - ]h^2/6z$$

wherein
$h$ is said depth of magnetization,
$z$ is equal to $s + (D+h)/2$,
$D$ is said toner particle diameter,
$s$ is the spacing between the magnetic recording medium and the applied toner particles, and
$\pi$ is equal to the ratio of the circumference of a circle to its diameter.

11. A method as claimed in claim 1, wherein:
said magnetic toner comprises single domain magnetically attractable particles; and
said wavelength is substantially equal to $$\pi/2\ (D+h) - \pi h^2/3(D+h)$$

wherein
$h$ is said depth of magnetization,
$D$ is said toner particle diameter, and
$\pi$ is equal to the ratio of the circumference of a circle to its diameter.

12. A method as claimed in claim 1, wherein:
said recording medium is magnetized in accordance with said information by magnetizing portions of said recording medium selected in accordance with said information at said wavelength and to said depth.

13. A method as claimed in claim 1, wherein:
said recording medium is magnetized in accordance with said information by magnetizing said recording medium substantially uniformly at said wavelength and to said depth, and by selectively demagnetizing said magnetized recording medium in accordance with said information.

14. A method as claimed in claim 1, wherein:
said recording medium is magnetized at said wavelength and to said depth of magnetization in a crossed line pattern.

15. A method as claimed in claim 1, wherein:
said recording medium is magnetized in accordance with said information by providing a magnetic pattern having said wavelength, and by selectively copying said magnetic pattern into said recording medium in accordance with said information to provide a magnetic record of said information having said wavelength and extending in said recording medium to said predetermined depth.

16. An article of manufacture for providing an image of input information with the aid of a magnetic toner having magnetically attractable particles of substantially a predetermined diameter, characterized by a magnetic recording medium magnetized substantially to a predetermined depth with alternating magnetic fields having as recorded a predetermined wavelength correlated to said depth of magnetization and to said toner particle diameter for optimized toner attraction.

17. An article of manufacture as claimed in claim 16, wherein:
said magnetic recording medium is substantially uniformly magnetized at said wavelength and to said depth whereby said article of manufacture is capable of providing said image upon demagnetization of portions distributed in accordance with said information, and upon application of said magnetic toner.

18. An article of manufacture as claimed in claim 16, wherein:
said magnetization of said recording medium exists in portions of said recording medium distributed in accordance with said information.

19. An article of manufacture as claimed in claim 16, wherein said wavelength is within a range of $$\text{from } \pi/2\ (z - h^2/6z) \text{ to } \pi/3\ (8z - h^2/z)$$

wherein
$h$ is said depth of magnetization,
$z$ is equal to $s + (D+h)/2$,
$D$ is said toner particle diameter, $s$ is a spacing between the magnetic recording medium and said toner, and $\pi$ is equal to the ratio of the circumference of a circle to its diameter.

20. An article of manufacture as claimed in claim 16, wherein:

said wavelength is within a range of $$\text{from } \pi/4\ (D+h) - \pi\ h^2/6(D+h) \text{ to } 4\pi/3\ (D+h) - 2\ \pi\ h^2/3(D+h)$$

wherein $h$ is said depth of magnetization, $D$ is said toner particle diameter, and $\pi$ is equal to the ratio of the circumference of a circle to its diameter.

21. An article of manufacture as claimed in claim 16, for use with magnetic toner comprising multidomain magnetically attractable particles, wherein:

said wavelength is within a range of $$\text{from } 2\ \pi/3\ (z - h^2/8z) \text{ to } \pi/3\ (8z - h^2z)$$

wherein $h$ is said depth of magnetization, $z$ is equal to $s + (D+h)/2$, $D$ is said toner particle diameter, $s$ is a spacing between the magnetic recording medium and said toner, and $\pi$ is equal to the ratio of the circumference of a circle to its diameter.

22. An article of manufacture as claimed in claim 16, for use with magnetic toner comprising multidomain magnetically attractable particles, wherein:

said wavelength is within a range of $$\text{from } \pi/3\ (D+h) - \pi\ h^2/6(D+h) \text{ to } 4\ \pi/3\ (D+h) - 2\ \pi\ h^2/3(D+h)$$

wherein $h$ is said depth of magnetization, $D$ is said toner particle diameter, and $\pi$ is equal to the ratio of the circumference of a circle to its diameter.

23. An article of manufacture as claimed in claim 16, for use with magnetic toner comprising single domain magnetically attractable particles, wherein:

said wavelength is within a range of $$\text{from } \pi/2\ (z - h^2/6z) \text{ to } 2\pi z - \pi h^2/3z$$

wherein $h$ is said depth of magnetization, $z$ is equal to $s + (D+h)/2$, $D$ is said toner particle diameter, $s$ is a spacing between the magnetic recording medium and said toner, and $\pi$ is equal to the ratio of the circumference of a circle to its diameter.

24. An article of manufacture as claimed in claim 16, for use with magnetic toner comprising single domain magnetically attractable particles, wherein:

said wavelength is within a range of $$\text{from } \pi/4\ (D+h) - \pi\ h^2/6(D+h) \text{ to } \pi(D+h) - 2\ \pi\ h^2/3(D+h)$$

wherein $h$ is said depth of magnetization, $D$ is said toner particle diameter, and $\pi$ is equal to the ratio of the circumference of a circle to its diameter.

25. An article of manufacture as claimed in claim 16, for use with magnetic toner comprising multidomain magnetically attractable particles, wherein:

said wavelength is substantially equal to $$4\ \pi z3 - \pi h^2/6z$$

wherein $h$ is said depth of magnetization, $z$ is equal to $s + (D+h)/2$, $D$ is said toner particle diameter, $s$ is a spacing between the magnetic recording medium and said toner, and $\pi$ is equal to the ratio of the circumference of a circle to its diameter.

26. An article of manufacture as claimed in claim 16, for use with magnetic toner comprising multidomain magnetically attractable particles, wherein:

said wavelength is substantially equal to $$2\ \pi/3\ (D+h) - \pi\ h^2/3(D+h)$$

wherein $h$ is said depth of magnetization, $D$ is said toner particle diameter, and $\pi$ is equal to the ratio of the circumference of a circle to its diameter.

27. An article of manufacture as claimed in claim 16, for use with magnetic toner comprising single domain magnetically attractable particles, wherein:

said wavelength is substantially equal to $$\pi z - \pi\ h^2/6z$$

wherein $h$ is said depth of magnetization, $z$ is equal to $s + (D+h)/2$, $D$ is said toner particle diameter, $s$ is a spacing between the magnetic recording medium and the applied toner particles, and $\pi$ is equal to the ratio of the circumference of a circle to its diameter.

28. An article of manufacture as claimed in claim 16, for use with magnetic toner comprising single domain magnetically attractable particles, wherein:

said wavelength is substantially equal to $$\pi/2\ (D+h) - \pi\ h^2/3(D+h)$$

wherein $h$ is said depth of magnetization, $D$ is said toner particle diameter, and $\pi$ is equal to the ratio of the circumference of a circle ot its diameter.

29. An article of manufacture as claimed in claim 16, wherein:

said magnetization to said depth and at said wavelength is present at least at crossing points of a prerecorded crossed magnetic line pattern.

30. An article of manufacture as claimed in claim 16, wherein:

said magnetization to said depth and at said wavelength is present in a pattern of mutually spaced dots.

31. An image of input information produced by a process comprising in combination the steps of:

providing a magnetizable recording medium;

providing a magnetic toner having magnetically attractable particles of substantially a predetermined diameter;

magnetizing said recording medium in accordance with said information substantially to a predetermined depth with alternating magnetic fields having as recorded a predetermined wavelength, said toner particle diameter, said depth of magnetization and said wavelength being correlated with each other for optimized toner attraction;
applying said magnetic toner to said magnetized recording medium to provide a toner image of said information; and
printing out said toner image to provide said image of the input information.

32. An image as claimed in claim 31, wherein:
said applied magnetic toner is spaced from said magnetized recording medium; and
said wavelength is within a range of $$\text{from } \pi/2\ (z - h^2/6z) \text{ to } \pi/3\ (8z - h^2/z)$$

wherein
$h$ is said depth of magnetization,
$z$ is equal to $s + (D+h)/2$,
$D$ is said toner particle diameter,
$s$ is the spacing between the magnetic recording medium and the applied toner particles, and
$\pi$ is equal to the ratio of the circumference of a circle to its diameter.

33. A method as claimed in claim 31, wherein: said wavelength is within a range of $$\text{from } \pi/4\ (D+h) - \pi\ h^2/6(D+h) \text{ to } 4\pi/3\ (D+h) - 2\ \pi\ h^2/3(D+h)$$

wherein
$h$ is said depth of magnetization,
$D$ is said toner particle diameter, and
$\pi$ is equal to the ratio of the circumference of a circle to its diameter.

34. An image as claimed in claim 31, wherein:
said magnetic toner comprises multidomain magnetically attractable particles;
said applied magnetic toner is spaced from said magnetized recording medium; and
said wavelength is within a range of $$\text{from } 2\ \pi/3\ (z - h^2/8z) \text{ to } \pi/3\ (8z - h^2/z)$$

wherein
$h$ is said depth of magnetization,
$z$ is equal to $s + (D+h)/2$,
$D$ is said toner particle diameter,
$s$ is the spacing between the magnetic recording medium and the applied toner particles, and
$\pi$ is equal to the ratio of the circumference of a circle to its diameter.

35. An image as claimed in claim 31, wherein:
said magnetic toner comprises multidomain magnetically attractable particles; and
said wavelength is within a range of $$\text{from } \pi/3\ (D+h) - \pi\ h^2/6(D+h) \text{ to } 4\pi/3\ (D+h) - 2\ \pi h^2/3(D+h)$$

wherein
$h$ is said depth of magnetization,
$D$ is said toner particle diameter, and
$\pi$ is equal to the ratio of the circumference of a circle to its diameter.

36. An image as claimed in claim 31, wherein:
said magnetic toner comprises single domain magnetically attractable particles;
said applied magnetic toner is spaced from said magnetized recording medium; and
said wavelength is within a range of $$\text{from } \pi/2\ (z - h^2/6z) \text{ to } 2\pi z - \pi h^2/3z$$

wherein
$h$ is said depth of magnetization,
$z$ is equal to $s + (D+h)/2$,
$D$ is said toner particle diameter,
$s$ is the spacing between the magnetic recording medium and the applied toner particles, and
$\pi$ is equal to the ratio of the circumference of a circle to its diameter.

37. An image as claimed in claim 31, wherein:
said magnetic toner comprises single domain magnetically attractable particles; and
said wavelength is within a range of $$\text{from } \pi/4\ (D+h) - \pi\ h^2/6(D+h) \text{ to } \pi\ (D+h) - 2\ \pi\ h^2/3(D+h)$$

wherein
$h$ is said depth of magnetization,
$D$ is said toner particle diameter, and
$\pi$ is equal to the ratio of the circumference of a circle to its diameter.

38. An image as claimed in claim 31, wherein:
said magnetic toner comprises multidomain magnetically attractable particles;
said applied magnetic toner is spaced from said magnetized recording medium; and
said wavelength is substantially equal to $$4\ \pi z/3 - \pi h^2/6z$$

wherein
$h$ is said depth of magnetization,
$z$ is equal to $s + (D+h)/2$,
$D$ is said toner particle diameter,
$s$ is the spacing between the magnetic recording medium and the applied toner particles, and
$\pi$ is equal to the ratio of the circumference of a circle to its diameter.

39. An image as claimed in claim 31, wherein:
said magnetic toner comprises multidomain magnetically attractable particles; and
said wavelength is substantially equal to $$2\ \pi/3\ (D+h) - \pi\ h^2/3(D+h)$$

wherein
$h$ is said depth of magnetization,
$D$ is said toner particle diameter, and
$\pi$ is equal to the ratio of the circumference of a circle to its diameter.

40. An image as claimed in claim 31, wherein:
said magnetic toner comprises single domain magnetically attractable particles;
said applied magnetic toner is spaced from said magnetized recording medium; and
said wavelength is substantially equal to $$\pi z - \pi h^2/6z$$

wherein
$h$ is said depth of magnetization,
$z$ is equal to $s + (D+h)/2$,
$D$ is said toner particle diameter,
$s$ is the spacing beetween the magnetic recording medium and the applied toner particles, and $\pi$ is equal to the ratio of the circumference of a circle to its diameter.

41. An image as claimed in claim 31, wherein:
said magnetic toner comprises single domain magnetically attractable particles; and
said wavelength is substantially equal to $$\pi/2\ (D+h) - \pi\ h^2/3(D+h)$$

wherein
$h$ is said depth of magnetization,
$D$ is said toner particle diameter, and
$\pi$ is equal to the ratio of the circumference of a circle to its diameter.

42. An image as claimed in claim 31, wherein:
said recording medium is magnetized in accordance with said information by magnetizing portions of said recording medium selected in accordance with said information at said wavelength and to said depth.

43. An image as claimed in claim 31, wherein:
said recording medium is magnetized in accordance with said information by magnetizing said recording medium substantially uniformly at said wavelength and to said depth, and by selectively demagnetizing said magnetized recording medium in accordance with said information.

44. An image as claimed in claim 31, wherein:
said recording medium is magnetized at said wavelength and to said depth of magnetization in a crossed line pattern.

45. An image as claimed in claim 31, wherein:
said magnetization to said depth and at said wavelength is distributed in a pattern of mutually spaced dots whereby said magnetic toner image is composed of discrete spaced toner piles.

46. An image as claimed in claim 31, wherein:
said recording medium is magnetized in accordance with said information by providing a magnetic pattern having said wavelength, and by selectively copying said magnetic pattern into said recording medium in accordance with said information to provide a magnetic record of said information having said wavelength and extending in said recording medium to said predetermined depth.

* * * * *